3,006,378
RESILIENT PLURAL ORIFICE FLOW CONTROL
Howard L. Erickson, Bensenville, and William H. Corbett, Chicago, Ill., assignors to The Dole Valve Company, Morton Grove, Ill., a corporation of Illinois
Filed Feb. 27, 1958, Ser. No. 717,867
3 Claims. (Cl. 138—46)

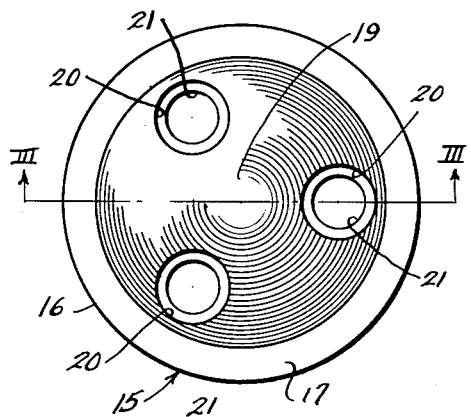
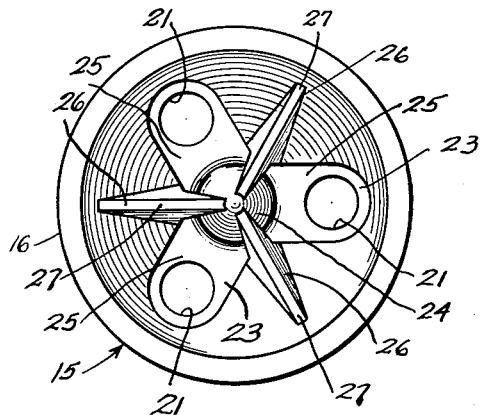
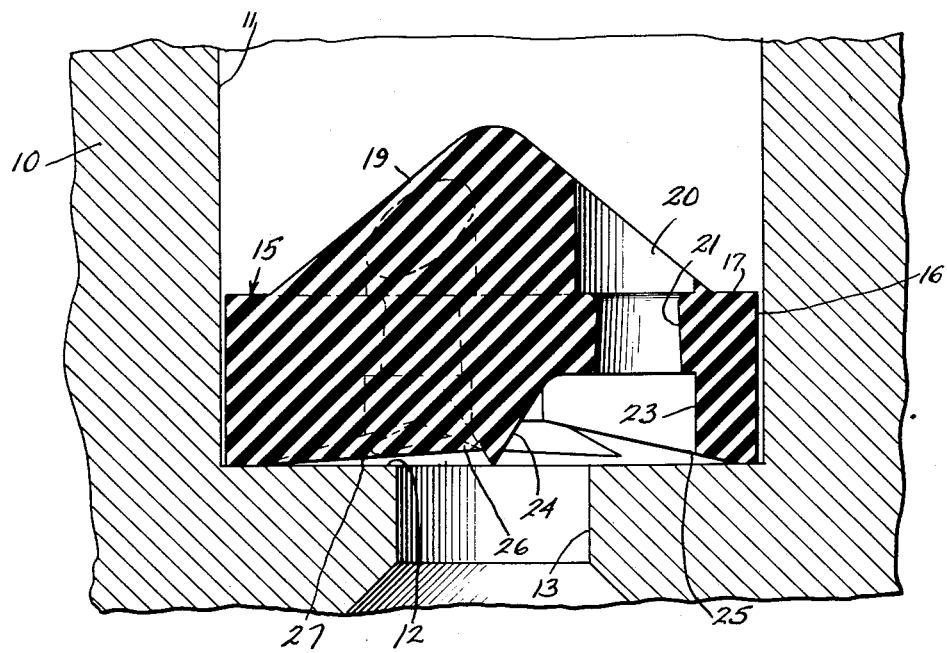

This invention relates to improvements in resilient uniform rate of flow control devices.

A principal object of the invention is to provide a simple and improved form of resilient flow control device for providing a substantially uniform rate of flow of fluid through a passageway, which is so constructed and arranged as to reduce noise in the controlled flow of fluid through the passageway.

Another object of the invention is to provide a simple and improved form of uniform rate of flow control device for controlling the flow of fluid through a passageway, in which noise is reduced and the control of the flow is attained by a resilient generally cylindrical disk having a plurality of orifices leading therethrough and spaced radially from the center thereof, and restricted upon increases in pressure by initial bending of the disk toward its seat and by radial pressure acting on the disk.

Still another object of the invention is to provide an improved noise reducing flow control device in the form of a generally cylindrical resilient flow control disk, in which noise is reduced by dividing a stream flowing through a passageway into a plurality of controlled streams and in uniformly bringing the streams together upstream of the outlet from the passageway.

A further object of the invention is to provide an improved noise reducing flow control device in which noise is reduced by a flow control disk dividing a stream flowing through a passageway into a plurality of controlled streams, and in which a silencing cone extending from the disk in the downstream direction prevents the streams from head on collision and uniformly diverts the streams to the outlet from the passageway.

These and other objects of the invention will appear from time to time as the following specification proceeds and with reference to the accompanying drawing wherein:

FIGURE 1 is a top plan view of a flow control device constructed in accordance with the invention, looking at the flow control device toward the upstream side thereof;

FIGURE 2 is a bottom plan view of the flow control device shown in FIGURE 1; and FIGURE 3 is a cross-sectional view taken through a fluid flow passageway, showing the flow control device seated in the passageway, and shown in section, taking substantially along line III—III of FIGURE 1.

In the embodiment of the invention illustrated in the drawing, we have shown in FIGURE 3 a portion of a casing 10, which may be a valve body, a conduit or the like. The casing 10 is shown as having an inlet passageway 11 leading thereinto having a shoulder 12 therein, terminating at its inner margin into a reduced diameter outlet passageway 13 axially aligned with the inlet passageway 11. The shoulder 12 is shown as being relatively wide and as forming a flat annular seat for a resilient flow control device 15, and accommodates flexure of said flow control device toward and from said seat upon variations in pressure on the upstream side of said flow control device.

The flow control device 15 may be made from a resilient or elastic material, such as rubber or one of the well known substitutes for rubber, such as an elastomer or the like, which is readily flexible radially and axially upon increases in pressure of the fluid acting thereon and which returns to its normal unstressed position shown in FIGURE 3, upon predetermined decreases in pressure.

The flow control device 15 is shown as being in the general form of a disk having a generally cylindrical outer wall 16, shown as being spaced radially inwardly from the wall of the passageway 11, and as having an annular shoulder 17 on the upstream face thereof, terminating in an approach cone 19, facing in an upstream direction and having a plurality of angularly spaced flow orifices 20 spaced radially from the center of said flow control device, and leading through said approach cone and having flow communication with axially aligned flow control-orifice 21. The flow control orifices 21 have communication with radial passageways 23 on the downstream face of the flow control device and leading to a central silencing cone 24 extending from the flow control device in a downstream direction.

The downstream face of the flow control device 15 is recessed inwardly from the periphery thereof, the recessed portion of which forms a face 25 in the general form of the frustum of a cone, and is seated on the shoulder 12 adjacent the periphery of the flow control device. The flow control device is thus seated adjacent its periphery to progressively bend radially inwardly from the outer margin of the flow control device along the shoulder 12 toward the outlet passageway 13, as the pressure on the upstream face of the flow control device increases, resulting in a constriction of the flow control orifices 21 as the pressure on the flow control device increases.

Extending radially outwardly from the silencing cone 24 along the downstream face 25 of the flow control device 15, and shown as being spaced equal distances between the flow control orifices 21, are radial support ribs or pads 26 extending from the recessed frusto-conical face 25 in a downstream direction and having sloping downstream faces 27 sloping in the same general direction but at a lesser angle than the face 25 and supporting the flow control device on the seat 12 upon high pressure conditions. The support pads 26 thereby limit the flexure of the flow control device toward the outlet passageway 13, upon high pressure conditions.

It may be seen with reference to FIGURE 3, that as the pressure of fluid acts on the upstream side of the flow control device 15, there will be a pressure drop across the flow control orifices 21 resulting in a pressure differential across the flow control device 15. The pressure on the downstream side of the flow control device 15 being less than the pressure on the upstream side thereof, and the flow control 15 being recessed on its downstream face, will bend radially inwardly toward the center of the outlet passage 13 upon increases in pressure, and the inward bending thereof will progress inwardly along the seat 12 from the periphery of the flow control device as the pressure thereon increases, until the support pads 26 come into engagement with the seat 12. This inward bending of the flow control device will result in a restriction or reduction in the cross-sectional area of the flow control orifices 21 as the pressure acting on the upstream side of the flow control device increases. In addition, to the bending action of the flow control device along the seat 12, pressure will act on the wall 16 of the flow control in a radially inward direction further restricting the flow control orifices 21, particularly under high pressure conditions, when inward bending movement of the flow control device has been limited by the support pads 26.

It should here be understood that with a flow control device having a single central orifice in which the outlet from the seat for the flow control device is larger than the orifice, as shown in the patent to Kempton No. 2,454,929, that there will be a gradient in velocity across the outlet adjacent the flow control device. The velocity will, therefore, be greatest in the projected area of the orifice of the flow control device, and there will be a tendency toward a static condition at the wall of the outlet, which will result in noise and turbulence.

By the flow control device of the present invention the orifices 21 separate the stream into a plurality of streams. The streams are then brought smoothly together upstream of the outlet. This will reduce concentrated areas of high and low velocity in the outlet with a resultant uniform velocity throughout the area of the outlet, substantially reducing turbulence in the outlet and thereby reducing noise in the flow of fluid through the outlet.

The noise reducing cone 24 further serves to prevent the stream of fluid flowing through the flow control orifices 21 from head on collision and uniformly diverts the streams to the outlet passageway 13, and cooperates with the flow control orifices 21 to further reduce the noise heretofore present with flow control devices.

It may further be seen that in addition to the high pressure pads 26, limiting inward movement of the flow control device along the seat 12, and therefore preventing undue distortion of the flow control device, that the approach cone 19 projecting in an upstream direction adds the rigidity to the flow control device required to provide the desired restriction in the cross-sectional area of the orifices 21, to attain the required flow through the flow control device, and cooperates with the high pressure support pads 26 to prevent undue restriction of the flow control orifices 21 upon excessive pressure conditions.

While we have herein shown and described one form in which our invention may be embodied, it will be understood that various variations and modifications of the invention may be effected without departing from the spirit and scope of the novel concepts thereof as defined by the claims appended hereto.

We claim as our invention:

1. In a uniform rate of flow control device, a housing having a flow passageway therethrough, an annular seat in said passageway facing in an upstream direction, means for maintaining a substantially constant rate of flow through said housing over a wide range of variations in pressure at the inlet end thereof comprising a resilient disk having a generally cylindrical outer wall and seated on said seat adjacent its periphery and having a plurality of flow control orifices leading therethrough, spaced radially outwardly from the center thereof equal distances and inwardly from the outer wall thereof, and angularly spaced equal distances apart, and uniformly restricting in cross-sectional area upon increases in pressure upstream of said disk, and a generally conical silencing flow diverting projection at the center of said disk inwardly of said orifices and facing in a downstream direction, said orifices dividing the stream flowing along said flow passageway into a plurality of separate streams and reducing the concentrated areas of high and low velocities and said flow diverting projection preventing the streams flowing through said orifices from head on collision and uniformly diverting the streams to merge upstream of the outlet and thereby reducing turbulence at the downstream side of said flow control device and noise in said flow control device.

2. In a uniform rate of flow control device, a housing having a flow passageway therethrough having an annular shoulder therein facing in an upstream direction and forming a flow control seat, and means for maintaing a substantially constant rate of flow through said passageway over a wide range of variations in pressure at the inlet end of said passageway comprising a resilient generally cylindrical disk seated on said annular shoulder adjacent its periphery and having a downstream face recessed inwardly from the periphery thereof and radially extending high pressure support pads extending from said recessed downstream face radially inwardly from the periphery thereof and spaced equal distances apart, said support pads having seat engaging faces inclined inwardly from the periphery of said disk and supporting said disk on said seat under high pressure conditions, an approach cone extending in an upstream direction from the upstream face of said disk and having an apex concentric with the center thereof, a plurality of flow passageways leading through said approach cone and spaced equal distances radially from the center thereof and deformable flow control orifices leading from said flow passageways axially through said disk inwardly of the periphery thereof and opening into the recessed downstream face of said disk between said support pads, and a generally conical flow diverting projection in the recessed downstream face of said disk inwardly of said flow control orifices preventing the streams flowing through said flow orifices from head on collision and uniformly diverting the streams to merge upstream of the outlet and thereby reducing turbulene at the downstream side of said disk and noise in said flow control device.

3. In a uniform rate of flow control device, a housing having a flow passageway therethrough, an annular seat in said passageway facing in an upstream direction, means for maintaining a substantially constant rate of flow through said housing over a wide range of variations in pressure at the inlet end thereof comprising a resilient disk having a generally cylindrical outer wall and having a downstream face recessed inwardly from the periphery thereof and seated on said seat adjacent the periphery of said disk and having a plurality of flow control orifices leading therethrough and opening to said inwardly recessed downstream face, said flow control orifices being spaced radially outwardly from the center of said disk equal distances apart and being spaced inwardly from the outer wall of said disk and also being angularly spaced equal distances apart, and uniformly restricting in cross-sectional area upon increases in pressure upstream of said disk, and equally spaced radially extending support pads spaced between said orifices equal distances therefrom and extending along and from said inwardly recessed downstream face toward said seat for engagement with said seat under high pressure conditions, to thereby limit deformation of said disk toward said seat upon high pressure conditions, whereby further restriction of said orifices after engagement of said support pads with said seat is attained by radial inward pressure on the cylindrical outer wall of said disk.

References Cited in the file of this patent

UNITED STATES PATENTS

| | | |
|---|---|---|
| 2,327,449 | Parker | Aug. 24, 1943 |
| 2,342,890 | Poulter | Feb. 29, 1944 |
| 2,508,793 | Miller | May 23, 1950 |
| 2,728,355 | Dahl | Dec. 27, 1955 |
| 2,775,984 | Dahl | Jan. 1, 1957 |
| 2,853,264 | Lodge | Sept. 23, 1958 |